Patented Oct. 10, 1939

2,175,699

UNITED STATES PATENT OFFICE 2,175,699

DE-EMULSIFIER

Max Powell, San Gabriel, Calif.

No Drawing. Application December 16, 1937,
Serial No. 180,165

5 Claims. (Cl. 196—4)

My invention relates to a de-emulsifier and a process of de-emulsifying crude mineral oil.

As is well known, mineral oil as it comes from the wells is practically always associated with varying quantities of water in the form of an emulsion. To break down the emulsion to separate the water from the oil many methods are used applying mechanical or chemical and electrical means or a combination of them. A common method of de-emulsifying crude mineral oil is the introduction of an agent in the form of a chemical compound or composition which causes a separation of practically all of the water from the oil. My invention relates to this class of de-emulsifiers.

I have discovered that glycerylricinoleate acts as an excellent de-emulsifier for crude mineral oil, superior in its universal application to all kinds of crude mineral oil to other chemical de-emulsifiers now in common use, when applied in the manner hereinafter described.

My de-emulsifier may be applied to crude oil in storage tanks but is preferably introduced to the crude oil as it is pumped from the oil well into the storage tank since by the latter method it is thoroughly mixed with the oil on its passage to the tank and requires no special means for agitation as would be necessary if applied to a stationary body of oil such as in tanks.

My invention consists in the use of glycerylricinoleate and the steps of de-emulsifying crude oil as hereinafter described and claimed.

As is well known, crude oil from different localities as it comes from the wells differs greatly not only in gravity composition and the state of emulsion and therefore it is necessary to make preliminary laboratory tests in order to ascertain the quantity and the strength of solution of the chemical de-emulsifying agent which will yield the best results in quickly and completely separating the water from the oil.

I make up a solution of a glycerylricinoleate in a suitable solvent but prefer to use a liquid hydrocarbon such as gasoline, kerosene or diesel oil and while the mono di and tri glycerylricinoleate may be used, I found that the monoglycerylricinoleate gives the best results. A series of solutions of my reagent is made using all the way from 2 oz. to 2½ lbs. per gallon of the solvent and in making the laboratory tests, say one liter of the crude oil is mixed with one cc. of the weakest solution and other liter samples are mixed with one cc. of progressively stronger solutions of the reagent, thoroughly agitated and allowed to stand. The strength of solution of the reagent which was used in the sample showing the best results, that is, rapidity and completeness of the de-emulsifying action, that is, separation of the water from the crude oil, is the one used for the treatment of the oil coming from the well. The de-emulsifying reagent is preferably added to the stream of oil as it comes from the well on its way to the storage tanks. For this purpose any suitable means such as pump may be used for introducing a minute quantity corresponding to the laboratory tests just referred to.

Some oils require a longer time for the water to separate out. The laboratory tests above referred to may sometimes let the crude oil samples treated with the reagent stand as long as 48 hours. When time is no particular object and there is sufficient storage capacity so that the crude oil may stand in the tanks for 48 hours or more before being transported to the refineries, the solution of the particular strength indicated will be satisfactory although it may take say 12 hours for the water to separate. Where it is necessary to have separation take place before said time of course the laboratory tests must be continued. It may be necessary also to increase the quantity of the reagent solution in order to bring about the desired result. In a few cases it may even be necessary to apply heat from 100 to 125 degrees F. to effect the de-emulsification. One of the advantages of my de-emulsifying reagent is the fact that ordinarily no heat treatment is required as in the case of many of the other de-emulsifying agents now in use. Depending upon the character of the crude oil, the separation of water is nearly complete usually within $\frac{1}{10}$ of 1%, although in some cases the water may be as high as ½ of 1%.

Another advantage of my reagent is the fact that a comparatively small quantity of the same suffices to bring about the de-emulsification as compared with those reagents now commonly in use, thereby rendering the process more economical.

Various changes may be made in the steps of my method without departing from the spirit of my invention as claimed.

I claim:

1. A sole active demulsifying agent for crude oil consisting solely of monoglycerylricinoleate.

2. A method of demulsifying crude oil comprising mixing the same with a solution having monoglycerylricinoleate as the sole active demulsifying agent present.

3. A method of demulsifying crude oil comprising mixing the same with a hydrocarbon solution having monoglycerylricinoleate as the sole active demulsifying agent present.

4. A method of demulsifying crude oil comprising mixing the same with a hydrocarbon solution having monoglycerylricinoleate as the sole active demulsifying agent present, and allowing the crude oil to settle until the water is separated out from the crude oil.

5. A method of demulsifying crude oil comprising mixing the same with a hydrocarbon solution having monoglycerylricinoleate as the sole active demulsifying agent present, applying heat to the crude oil and allowing the same to settle until the water is separated therefrom.

MAX POWELL.